Figure 1:
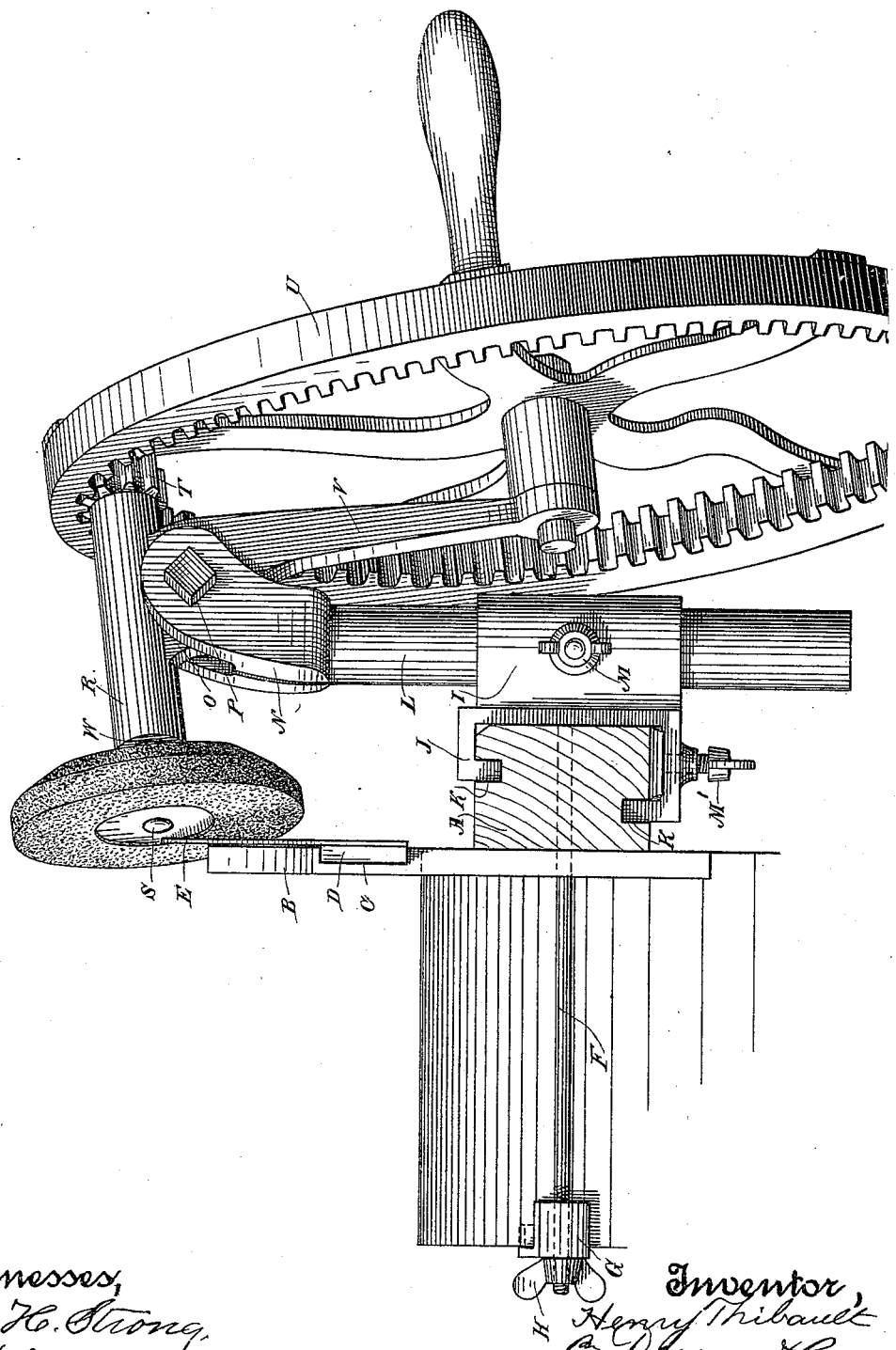

(No Model.) 2 Sheets—Sheet 1.

H. THIBAULT.
SICKLE GRINDER.

No. 440,337. Patented Nov. 11, 1890.

Witnesses,
Geo. H. Strong.
J. H. Nourse

Inventor,
Henry Thibault
By Dewey & Co.
Attys (No Model.) 2 Sheets—Sheet 2.
H. THIBAULT.
SICKLE GRINDER.
No. 440,337. Patented Nov. 11, 1890.
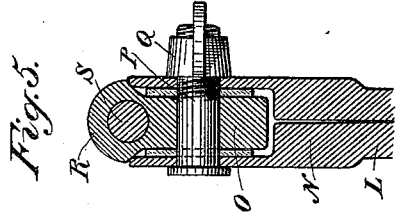
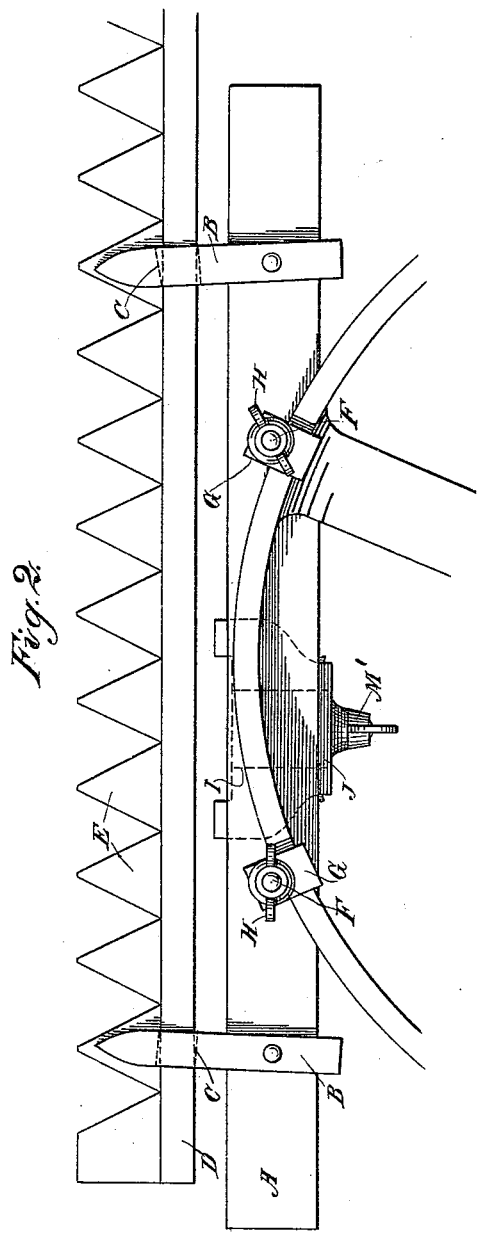
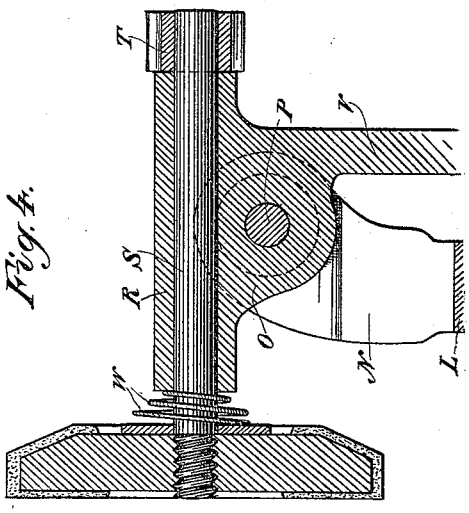
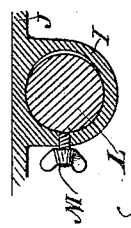
Witnesses,
Geo. H. Strong
J. B. Nourse
Inventor,
Henry Thibault
By Dewey & Co.
attys

UNITED STATES PATENT OFFICE.

HENRY THIBAULT, OF SAN FRANCISCO, CALIFORNIA.

SICKLE-GRINDER.

SPECIFICATION forming part of Letters Patent No. 440,337, dated November 11, 1890.

Application filed March 3, 1890. Serial No. 342,450. (No model.)

*To all whom it may concern:*

Be it known that I, HENRY THIBAULT, a citizen of the United States, residing in the city and county of San Francisco, State of California, have invented an Improvement in Sickle-Grinders; and I hereby declare the following to be a full, clear, and exact description of the same.

My invention relates to a device which I term a "sickle-grinder."

It consists of a support for the sickle, a means for fixing said support upon one of the wheels of the mowing or reaping machine, an adjustable standard with a grinding-disk mounted upon a shaft thereon, and means for adjusting said disk to the teeth of the sickle, and for rotating the disk, so as to grind the teeth.

Referring to the accompanying drawings for a more complete explanation of my invention, Figure 1 is an end view of my device. Fig. 2 shows the bar as attached to a cutter-wheel. Fig. 3 is a horizontal section through the standard and its socket. Fig. 4 is a longitudinal vertical section through the journal and its connected parts. Fig. 5 is vertical cross-section of the same.

A is a supporting device for the sickle. It consists of a bar of sufficient length having the arms B, pivoted to one side of it. These arms are notched at a point above the bar A, as shown at C, the notches being adapted to receive the bar D of the sickle, to which the cutting-teeth E are bolted. The arms B being pivoted to the bar A when they are set vertically, the sickle-bar is set into the channels in the arms and they are then pushed toward each other, so as to bind upon the sickle-bar and hold it firmly in place. In order to support this device in a suitable manner, so that the sickle may be ground or sharpened, I have shown bolts F, passing through the timber A, and having the clamps G movable upon them. These clamps are adapted to clasp the flange of the wheel of the mowing or other cutting machine, and by means of the thumb-nuts H upon the bolts they are forced against the rim of the wheel, so that the beam or timber A is drawn tight against the outer side of the wheel-rim, and is thus temporarily held in a firm and solid manner, the wheel serving as a bench or support for the work. The clamps G have the upper limb made longer than the lower one, so as to steady the clamps and prevent their twisting out of place when screwed up, and the short limb enables me to remove them easily without unscrewing the nuts too far.

Upon the side of the bar A is the clamp J, so formed as to engage grooves or channels K in the top and bottom of the bar A, so that while this clamp may slide along the bar it is prevented from leaving it. Upon the side of the clamp is a socket I. This socket is intended to hold the standard L, upon which the grinding mechanism is supported. The standard L passes through the socket, and is secured by a set-screw M, which clamps it firmly in place. In order to prevent the standard from slipping or turning within the socket, I have made the latter slightly oval or egg-shaped opposite to the set-screw, so that the standard will have two points of bearing within the socket in addition to the point which is pressed upon by the screw, and it will thus be held and prevented from turning. Beneath the clamp is another set-screw M', by which the clamp is locked upon the bar A at any desired point, so as to hold the grinding-disk in proper relation with the tooth to be ground.

The standard L has a fork N at the top, within which is held the knuckle or swivel joint O, which carries the supports for the driving-gear, and the shaft of the grinding-disk. The shank L is split a short distance below the fork at the upper end, and leather or wooden washers are placed within the fork upon each side of the swivel or knuckle joint, and a screw P passes through the fork and the joint, having a thumb-nut Q upon the outer end by which it may be tightened. When this thumb-nut is turned, it will be manifest that it will compress the sides of the fork firmly against the knuckle-joint and thus retain it at any angle with reference to the standard that may be desired. Upon the top of this knuckle-joint is the journal-box R, within which rotates the shaft S. This shaft is longer than the box and has a pinion T upon one end which is engaged by the internal gear U. This gear is journaled upon a shaft fixed at the lower end of an arm or hanger V, which extends downwardly from the box and knuckle-joint, before described, and forming a part of these. It may be turned about the joint when the set screw is loosened, so that the driving gear-wheel and pinion and the shaft of the grinding-disk are all moved together, and the disk may thus be set at any desired angle with relation to the teeth of the cutter. This disk may be of any suitable grinding material. I have preferred to make it of emery, corundum, or other suitable powder fixed upon wooden disks, and the disk is adapted to be screwed upon the end of the pinion-shaft. There is a space between the end of the journal-box of this shaft and the hub of the disk, and this space allows the shaft to have an end movement within its box. A spring W surrounds the shaft, pressing against the end of the journal-box and the hub of the grinding-disk, and this presses the disk outwardly, so that it will be held against the cutter to be sharpened with an elastic pressure. This spring is made conical, so that when pressed together the turns may fall one within the other and allow the spring to be compressed endwise, so as to form a flat coil. This is necessary because the end motion of the shaft is limited, and I am enabled by this form of spring to utilize the whole of the end movement, which could not be done with an ordinary spiral.

One side of the disk is made plane, as shown, and the other has a beveled face. The plane side is adjusted to the angle of a cutter-tooth by turning standard L within its socket and also turning the supporting journal-box of the disk-shaft around the knuckle-joint, before described, until the face of the grinding-disk stands in the plane with the surface of the cutter-tooth which is to be ground. Then by rotating the driving gear-wheel the disk will be caused to rotate rapidly, and by reason of the spring, before described, will press against the cutter with an elastic pressure until the latter is sufficiently sharpened.

If the cutter-tooth has a deep notch in it, formed by striking a stone or other hard substance, so that while it is necessary to sharpen this portion it is not advisable to cut down the whole edge of the tooth to that depth, these indentations are sharpened by reversing the disk upon its shaft, so as to bring the beveled or inclined face against the cutter-tooth, and it may be adjusted by means, before described, so as to press upon the exact point where the grinding is to take place.

The beam A having been adjusted upon the side of one of the wheels of the machine, as before described, the cutter-bar is removed from its guides and is clamped by the holding-arms B, so that the beveled sides of the cutting-teeth are presented outwardly. The standard L is then adjusted within the socket I, which with its clamp J is moved to the desired point upon the bar A and locked in that place. The grinding-disk is set at the proper angle with relation to the bevel of the teeth of the cutter, and one side of each tooth may then be ground by moving the sliding clamp along the bar until one side of all the teeth are ground. The device is then reversed in position so as to stand parallel with the other bevel of each cutter, and it may be moved successively from one tooth to the other until the opposite end of the cutter is reached and the whole of the teeth have been sharpened. The apparatus may then be removed from the wheel, the cutter replaced on its guide, and the apparatus packed into a box upon the machine, where it will take very little room and will always be in readiness for future use.

Having thus described my invention, what I claim as new, and desire to secure by Letters Patent, is—

1. The sickle-supporting bar A, with the clamping-arms B, to which the sickle is secured, the bolts passing through the supporting-bar, having the clamps and adjusting-screws whereby the device may be rigidly fixed to a wheel of the machine, a sliding clamp fitted upon the supporting-bar having the locking-screw, and a socket, in combination with a standard fitting said socket and carrying the grinding-disk and driving-gearing, substantially as herein described.

2. The sliding clamp fitted to move upon the bar to which the sickle is secured having a vertical socket made oval in shape, a set-screw passing through the side of said socket in the direction of its longest diameter, and a cylindrical shank or standard L, from which the grinding-disk and driving-gear are supported, said shank fitting the socket and being adjusted and locked in place by the set-screw, substantially as herein described.

3. A supporting-bar and clamps whereby the sickle and its cutters are held, a sliding clamp adjustable upon said bar, a standard adjustable in the socket upon said clamp, and having the split fork at the upper end with a clamping-screw and nut, in combination with a journal-box within which the shaft of a grinding-disk rotates, an arm or hanger depending from said box and carrying the main driving-gear, a pinion upon the end of the disk-shaft engaged by said gear, and a knuckle or swivel joint forming the support of the journal-box and hanger, and adjustable within the fork-head of the standard, substantially as herein described.

4. A support for the sickle-bar and its cutters, a sliding clamp movable upon said support with relation to the cutters, and a standard having the adjustable grinding disk and driving-gearing fixed upon its upper end, in combination with the shaft of the grinding-disk having an end movement within its journal-box and the spring pressing against the disk, so as to force it against the cutter to be ground with an elastic pressure, substantially as herein described.

5. A grinding-disk mounted upon a shaft journaled upon a standard which is adjustable with relation to the faces to be ground, a journal-box within which the shaft has an end motion, and a conical spring surrounding the shaft between the end of the box and the disk, so that the coils of the spring can be compressed within each other, substantially as herein described.

In witness whereof I have hereunto set my hand.

HENRY THIBAULT.

Witnesses:
S. H. NOURSE,
H. C. LEE.